Figure 1:
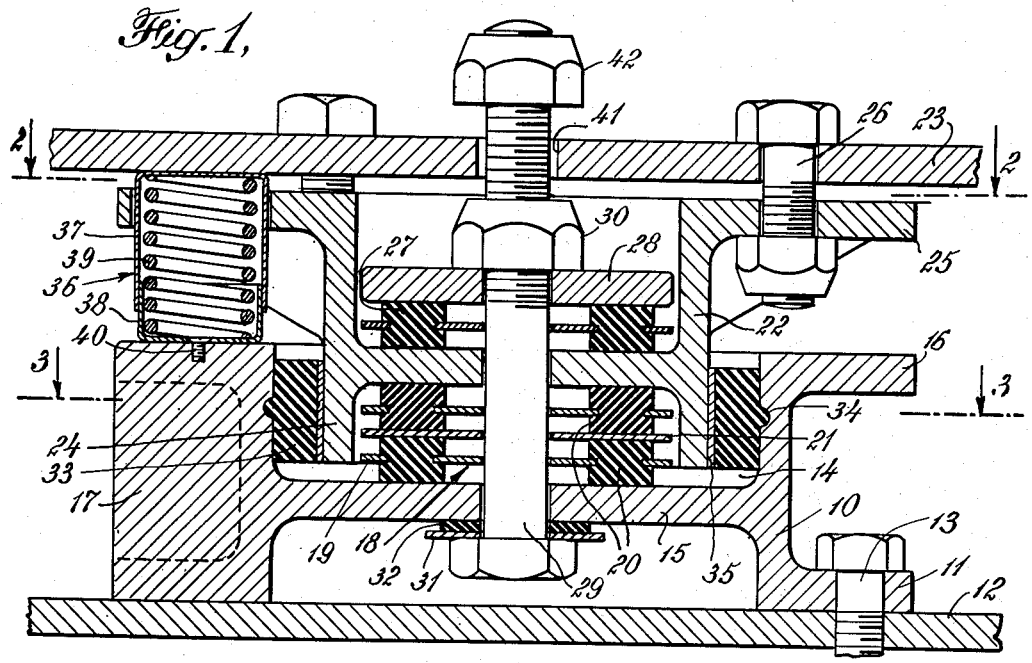

Nov. 24, 1953  G. R. MUNRO  2,660,386
VIBRATION AND SHOCK ISOLATOR
Filed Dec. 29, 1951  2 Sheets-Sheet 1

INVENTOR
George R. Munro
BY
ATTORNEYS

Nov. 24, 1953

G. R. MUNRO 2,660,386

VIBRATION AND SHOCK ISOLATOR

Filed Dec. 29, 1951

2 Sheets-Sheet 2

INVENTOR
George R. Munro
BY
Pennie Edmonds Morton Barrows Taylor
ATTORNEYS

Patented Nov. 24, 1953

2,660,386

UNITED STATES PATENT OFFICE 2,660,386

VIBRATION AND SHOCK ISOLATOR

George Rolfe Munro, Massapequa, N. Y., assignor to Waugh Equipment Company, New York, N. Y., a corporation of Maine Application December 29, 1951, Serial No. 264,011

4 Claims. (Cl. 248—21)

This invention relates to mounts to be interposed between an object and a fixed support for carrying the weight of the object and protecting it against vibration and shock. More particularly, the invention is concerned with a heavy duty mount, which is suitable for use with objects of great weight and is capable of isolating vertical vibration and absorbing both vertical and horizontal shock. The new mount may be advantageously used on shipboard for supporting the elements of a diesel-electric system of propulsion, including the engine, generator, and motor, and a form of the new mount suitable for such application will, accordingly, be illustrated and described for purposes of explanation.

The mount of this application is an improvement on that disclosed in the co-pending application of Dilg and Munro, Ser. No. 179,498, filed August 15, 1950, now abandoned, and is similar in some respects to that disclosed in the co-pending application of Roy, Ser. No. 264,049, filed December 29, 1951.

In the past, marine diesel engines were commonly bolted directly and solidly to the engine foundation but, more recently, it has been common to support such engines on mounts made up of nested coil springs interposed between the bed plates of the engine and the foundation, such spring units being of large capacity and capable of sustaining loads of the order of 1600 to 1800 lbs. per unit. Such a coil spring mount is open to the objection that it is capable of isolating vibration in a vertical direction only and does not protect the engine against heavy shocks, such as may result in a naval vessel from a hit or near miss. Such a shock is thus liable to damage the mount, so that a misalignment of the engine and generator shafts sufficient to make operation of the engine impossible may result.

The present invention is directed to the provision of a heavy duty mount, which may be used to support a massive vibrating object, such as a diesel engine, and is capable of isolating the vibration of the object and also of protecting it against shocks from all directions.

In its preferred form, the new mount includes a base adapted to be secured to a fixed support, such as the deck or other part of the structure of the ship. The base has an upright projection, which is closed at its upper end by a transverse wall lying below the extreme top of the base, so that, at its top, the base has a socket defined by the wall and by a vertical peripheral flange. At the top of the socket, the base is provided with a lateral circumferential flange. A head is attached to the object above the base and is preferably cup-shaped and provided at its upper end with a lateral attaching flange and, at its lower end, with a tubular extension entering the socket in the base. A shock-absorbing unit is mounted in the socket at the top of the base and engages the under side of the bottom of the head within the extension and a second shock-absorbing unit rests upon the upper side of the bottom of the head. Tying means hold the assembly of the base, head, and shock-absorbing units together, and a third shock-absorbing unit lies between the telescoped portions of the head and base. The head is secured to the object in such manner as to allow the object a limited freedom of vertical movement relative to the head and a vibration-isolating unit is interposed between the object and the base. The vibration-isolating unit isolates the normal vibration of the object and, if the support is subjected to a heavy shock in any direction, such shock is absorbed by the shock-absorbing units, so that the object is protected against damage.

Figure 2:
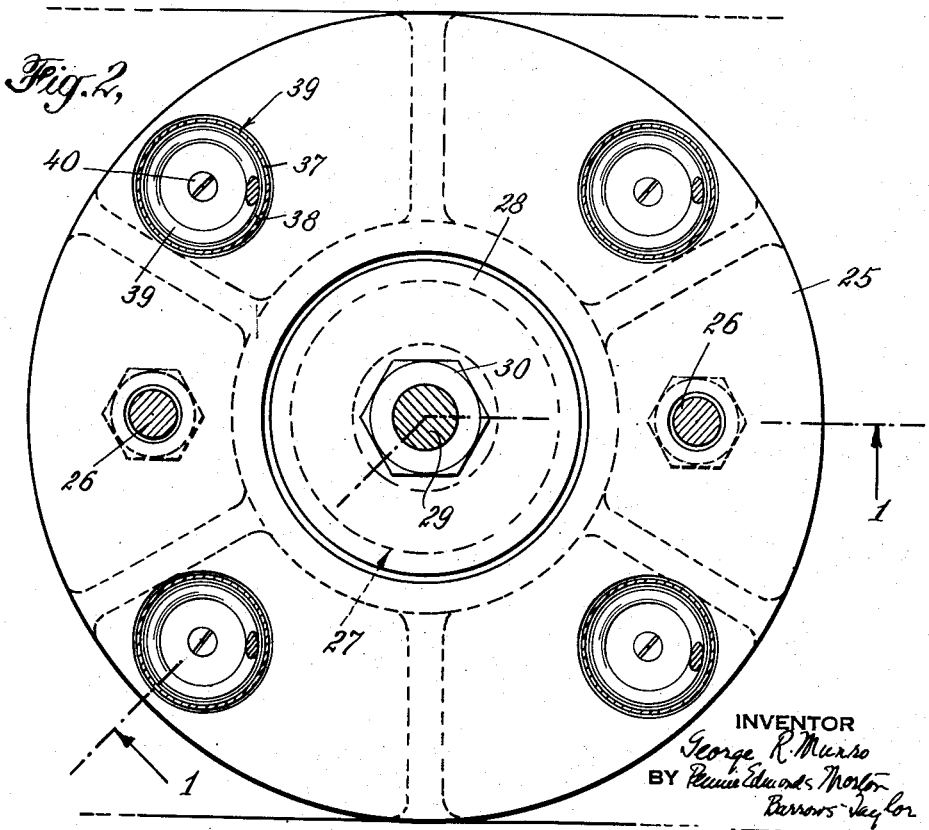
Figure 3:
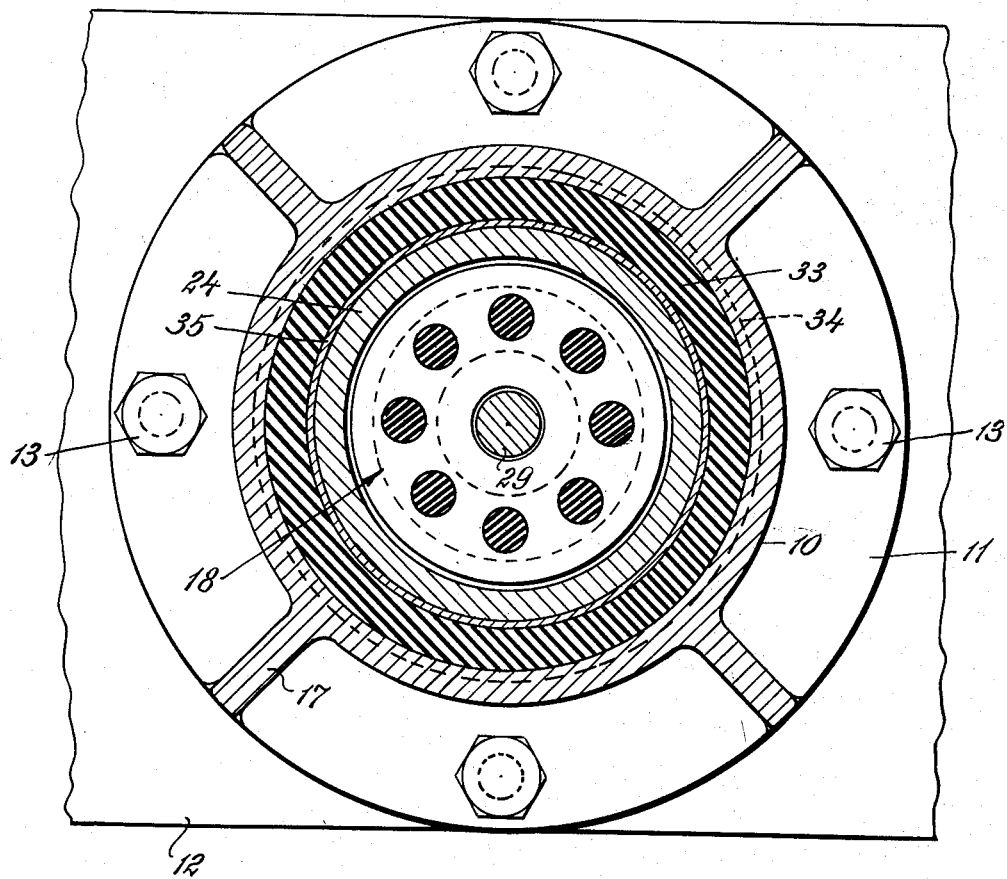

For a better understanding of the invention, reference may be made to the accompanying drawings, in which Fig. 1 is a vertical sectional view through one form of the new mount on the line 1—1 of Fig. 2; and Figs. 2 and 3 are transverse sectional views on the lines 2—2 and 3—3, respectively, of Fig. 1.

The mount in the form shown in Fig. 1 comprises a base 10 provided at its top with a lateral flange 11, which may be secured to a rigid support 12 by bolts or cap-screws 13. The base has a socket 14 in its upper end above a transverse wall 15 and, at its top, the base is provided with a lateral circumferential flange 16, which is connected at intervals to flange 11 by webs 17.

A shock-absorbing unit generally designated 18 rests on top of wall 15 within the concavity of the base, and the unit is made up of rubber springs with adjacent springs separated by a divider plate. Each spring consists of a flat metal disc 19 and rubber rings 20 applied to opposite faces of the disc and connected by necks of rubber passing through openings in disc 19. Each divider plate 21 is a flat metallic disc and the divider plates and the springs have central openings. A head 22 of cup form is secured to the object 23 above the base and the head is formed with a tubular extension 24, which enters the concavity of the base. At its upper end, the head is provided with a lateral circumferential flange 25 having spaced openings, through which extend bolts 26 connecting the flange to the object with a space between.

A shock-absorbing unit 27, illustrated as a single rubber spring, lies on the bottom of the base within the concavity thereof, and a follower ring 28 rests on top of unit 27.

The head and base are connected by a bolt 29, which passes through an opening in wall 15 of the base and through aligned openings in shock-absorbing units 18 and 27, the bottom of the head, and follower 28. The bolt carries a nut 30, which engages the top of follower 28, and a metallic washer 31 and a resilient washer 32 are interposed between the head of the bolt and the under surface of wall 15 of the base.

A third shock-absorbing unit in the form of a rubber sleeve 33 is attached to the inner cylindrical wall of the base within its concavity and, for this purpose, the wall is provided with a circumferential channel 34, into which the rubber may enter. The inner surface of the rubber sleeve carries a metallic sleeve 35, which is bonded thereto to take wear and engages the outer surface of the extension 24 on the head.

The normal vibration of the object is isolated by a vibration-isolating unit comprising a plurality of spring units 36 extending through openings in flange 25, each unit engaging the top of flange 16 of the base and the under surface of object 23. Each unit comprises upper and lower telescoping metallic cups 37, 38, which enclose a coil spring 39. If desired, the bottom cup 38 of each unit may be secured to flange 16 by a screw 40 passing through an opening in the bottom of the cup and into flange 16.

The bolt 29 extends upwardly beyond nut 30 and through an opening 41 in the object. A nut 42 is mounted on the threaded end of the bolt above the top of the object.

In the installation shown in Fig. 1, the normal vibration of the object is less than the distance between the object and the flange 25 on the head, and such vibration results in alternate compression and expansion of the spring units 36. If the support is subjected to a shock tending to move it upwardly relative to the object, the base and head move upwardly and compress the spring units 36, until flange 25 on the head engages object 23. Thereafter, further movement of the support and base relative to the object results in compression of shock-absorbing unit 18. In the event of a vertical shock tending to move the support downwardly relative to the object, bolt 29 is moved downwardly with the base and the shock-absorbing unit 27 is compressed between the follower 28 and the bottom of the head. If a vertical shock in either direction includes a horizontal component tending to move the support laterally with reference to the object, such component is absorbed by compression of the rubber sleeve 33 between the telescoping portions of the base and head.

I claim:

1. A mount for isolating vibration and absorbing shock between an object and a support, which comprises a base adapted to rest upon a support, means for securing the base rigidly to the support, a head, means for connecting the head to the object above the base, said means permitting limited vertical movement of the head relative to the object, shock-absorbing means connected to the base and engaging the head to resist vertical movement of the head toward and away from the base, shock-absorbing means engaging the head and base and resisting relative lateral movement of the head and base, and vibration-isolating means seated on the base at one end and adapted to engage the object at the other, said vibration-isolating means tending to urge the object away from the base to the limit permitted by said connecting means.

2. A mount for isolating vibration and absorbing shock between an object and a support, which comprises a base adapted to rest upon a support, means for securing the base rigidly to the support, a head, means for connecting the head to the object above the base, said means permitting limited vertical movement of the head relative to the object, shock-absorbing means connected to the base and engaging the head to resist vertical movement of the head toward and away from the base, shock-absorbing means engaging the head and base and resisting relative lateral movement of the head and base, and a plurality of vibration-isolating spring units seated in spaced relation on the base at one end and adapted to engage the object at the other, said spring units tending to urge the object away from the base to the limit permitted by said connecting means.

3. A mount for isolating vibration and absorbing shock between an object and a support, which comprises a base adapted to rest upon a support and having a socket at its upper end, means for attaching the base rigidly to the support, a head having an extension from its lower end entering the socket in the projection, means for connecting the head to the object for limited vertical movement relative to the object, shock-absorbing means connected to the base and engaging the head above and below to resist vertical movement of the head toward and away from the base, shock-absorbing means spaced from the first shock-absorbing means and lying between the overlapping parts of the head and base to resist relative lateral movement of the head and base, and vibration-isolating means seated on the base at one end and adapted to engage the object at the other, said vibration-isolating means tending to urge the head and object apart to the limit permitted by said connecting means.

4. A mount for isolating vibration and absorbing shock between an object and a support, which comprises a base adapted to rest upon the support and having a socket at its upper end and a peripheral flange extending laterally from the base at its top, means for securing the base rigidly to the support, a head of cup shape having a peripheral lateral flange at its upper end and an extension from its lower end entering the socket in the base, means for connecting the head flange to the object, said means permitting limited vertical movement of the head relative to the object, a first shock-absorbing unit seated on the bottom of said socket and engaging the head within the extension, a second shock-absorbing unit seated on the bottom of the head, a plate supported by the second unit, means engaging the base and plate and preventing them from moving apart vertically, a third shock-absorbing unit spaced from the first and interposed between the overlapping parts of the extension and projection to resist relative lateral movement of the head and base, and vibration-isolating means seated on the peripheral flange on the base at one end and adapted to engage the object at the other, said vibration-isolating means tending to urge the head and object apart to the limit permitted by the connecting means.

GEORGE ROLFE MUNRO.

References Cited in the file of this patent

UNITED STATES PATENTS

| Number | Name | Date |
|---|---|---|
| 1,694,758 | Summers et al. | Dec. 11, 1928 |
| 1,998,206 | Rozenzweig | Apr. 16, 1935 |
| 2,189,708 | Coyne | Feb. 6, 1940 |